Feb. 13, 1951   R. S. ENABNIT   2,541,644
APPARATUS FOR VULCANIZING PNEUMATIC TIRES
WITH RADIO FREQUENCY CURRENT
Filed Dec. 15, 1948   2 Sheets-Sheet 1

INVENTOR.
ROBERT S. ENABNIT
BY
*R H Waters*
ATTORNEY

Feb. 13, 1951     R. S. ENABNIT     2,541,644
APPARATUS FOR VULCANIZING PNEUMATIC TIRES
WITH RADIO FREQUENCY CURRENT

Filed Dec. 15, 1948     2 Sheets-Sheet 2

*INVENTOR.*
ROBERT S. ENABNIT

BY

*ATTORNEY*

Patented Feb. 13, 1951

2,541,644

UNITED STATES PATENT OFFICE 2,541,644

APPARATUS FOR VULCANIZING PNEUMATIC TIRES WITH RADIO-FREQUENCY CURRENT

Robert S. Enabnit, Cuyahoga Falls, Ohio, assignor to Wingfoot Corporation, Akron, Ohio, a corporation of Delaware Application December 15, 1948, Serial No. 65,478

9 Claims. (Cl. 18—17)

This invention relates to pnuematic tire vulcanizing equipment including inflatable air bags, and, more particularly, is concerned with apparatus of the indicated type including radio frequency current heating mechanisms.

It has been proposed heretofore to employ radio frequency current in the vulcanization of pneumatic tires, and the like. However, it is now well known that many difficulties are experienced in applying known principles to the vulcanization of pneumatic tires. It has been found that radio frequency arcing with attendant burning of the pneumatic tire often results, portions of the tire to be vulcanized may be over cured, whereas other portions may be under cured, and the use of steel molds, long standard in the pneumatic tire vulcanizing art, presents difficulties. These and other complications have to date prevented any adoption in production of radio frequency vulcanization of pneumatic tires.

It is the general object of the present invention to avoid and overcome the foregoing and other difficulties of and objections to prior known practices by the provision of an improved, simplified, relatively inexpensive, and practical apparatus for using radio frequency currents in the vulcanization of pneumatic tire casings.

Another object of the invention is to provide apparatus of the indicated type employing a conventional steel tire mold and a substantially conventional rubber air bag.

Another object of the invention is the provision of pneumatic tire vulcanizing apparatus employing radio frequency currents with a single set of conduit means for simultaneously supplying fluid under pressure to the interior of the air bag, and for delivering radio frequency current to an electrode associated with the air bag.

Another object of the invention is to provide in apparatus of the indicated character means for automatically connecting fluid to the inside of the air bag and for automatically connecting radio frequency current leads to the air bag electrode when the mold is closed, such means automatically functioning to disconnect the fluid pressure to the air bag and the radio frequency current to the air bag electrode when the mold parts are opened.

The foregoing objects of the invention, and other objects which will become apparent as the description proceeds, are achieved by the provision in pneumatic tire vulcanizing apparatus of a two part mold, a rubber-like air bag adapted to be positioned internally of the mold when it is closed, a high frequency electrode associated with the air bag, a valve stem or a plurality of valve stems on the air bag and electrically connected to the electrode, means electrically insulating the electrode and valve stem or stems from the mold, metallic conduit means adapted to be connected to the valve stem or stems, means supplying fluid to the interior of the air bag through the inside of the conduit means, means supplying radio frequency current to the electrodes by way of the metallic portion of the conduit means, and means for automatically connecting the conduit means and valve stems or stem when the mold is closed and for automatically disconnecting the conduit means and the valve stem or stems when the mold is opened. Preferably, the air bag includes a plurality of valve stems which are positioned uniformly around the bag, with fluid being circulated through the air bag by a plurality of valve stems in use. Also, the metallic conduit means preferably include spider-like arm portions extending to the several valve stems from a central post in angularly uniform directions.

For a better understanding of the invention, reference should be had to the accompanying drawings, wherein.

Figure 4:
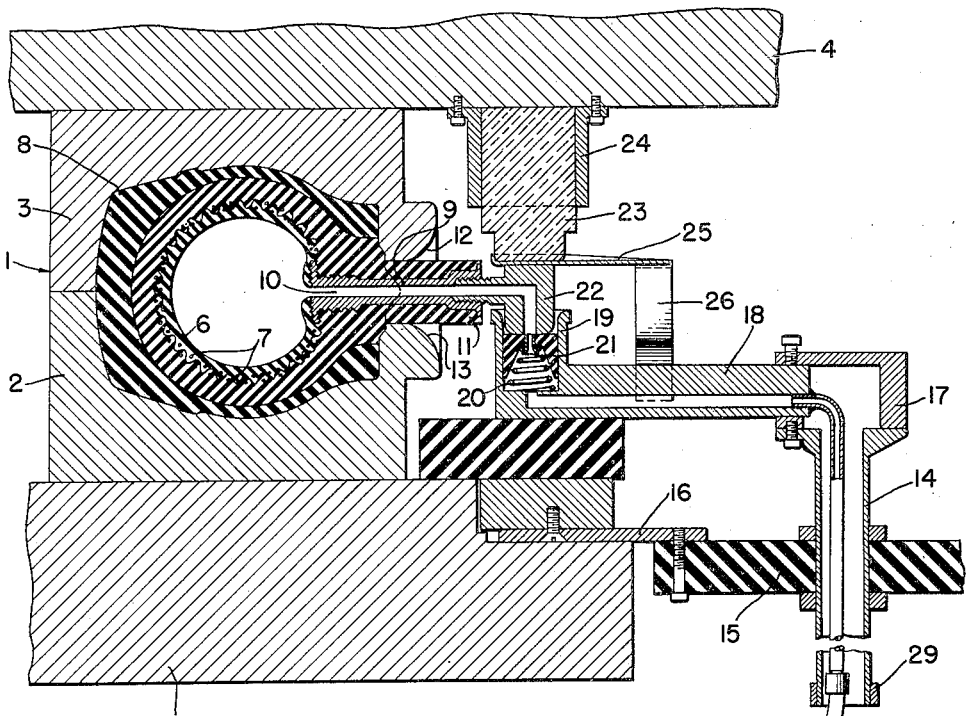
Fig. 4 is a vertical fragmentary cross-sectional view taken substantially on line IV—IV of Fig. 1, but with the upper mold half closed down to vulcanizing position, and illustrating details of the apparatus.

Having more specific reference to the drawings, the numeral 1 indicates generally a substantially conventional tire mold, usually of iron or steel, and with or without conventional matrix inserts. The mold is formed of several parts, such as the complementary mold halves 2 and 3. The upper mold half 3 is conveniently secured in any suitable manner to an upper platen 4, and the lower mold half 2 is secured in any desired fashion to a lower platen 5 (as seen in Fig. 4), the platens being adapted to be moved together or apart to open or close the mold. The platen movement is accomplished in any of the many known ways, it being understood that the platens may form an individual pneumatic tire vulcanizing apparatus of the watch case type.

Removably associated with the mold 1 is an air bag, indicated as a whole by the numeral 6, constructed of rubber or rubber-like material and including an electrode 7. The electrode 7 is of any desired flexible type extending circumferentially of the air bag and also laterally so as to provide an electrode over substantially the entire area of the air bag. The present invention is not concerned per se with the construction of the air bag and the electrode, and hence the electrode will not be described in greater detail.

It is part of the invention, however, that the air bag and electrode be sufficiently flexible and of conventional form so that the air bag can be handled by a conventional tire shaping and bagging machine which collapses the air bag, shapes the unvulcanized tire carcass from the flat pulley band shape to a toric form and then positions the air bag inside of the unvulcanized tire carcass ready for the bag and carcass to be placed in a vulcanizing mold.

In the drawings, the numeral 8 indicates a pneumatic tire carcass of substantially conventional type, positioned in the mold parts with the air bag 6 inside of it in conventional manner. The air bag 6 is provided with one or more valve stems 9 of metal having internal bores 10 connecting to the inside of the air bag. Each valve stem 9 is electrically connected to the electrode 7. Morever, each valve stem 9 is electrically insulated from the mold 1, and this may be achieved by the provision of a rubber sleeve 11 around the metal valve stem over that portion thereof extending out of the air bag. The rubber sleeve 11 is received within half round openings 12 and 13 formed in the mold proper, or in known types of complementary blocks set into recesses formed in the mold around the valve stem.

Figure 1:
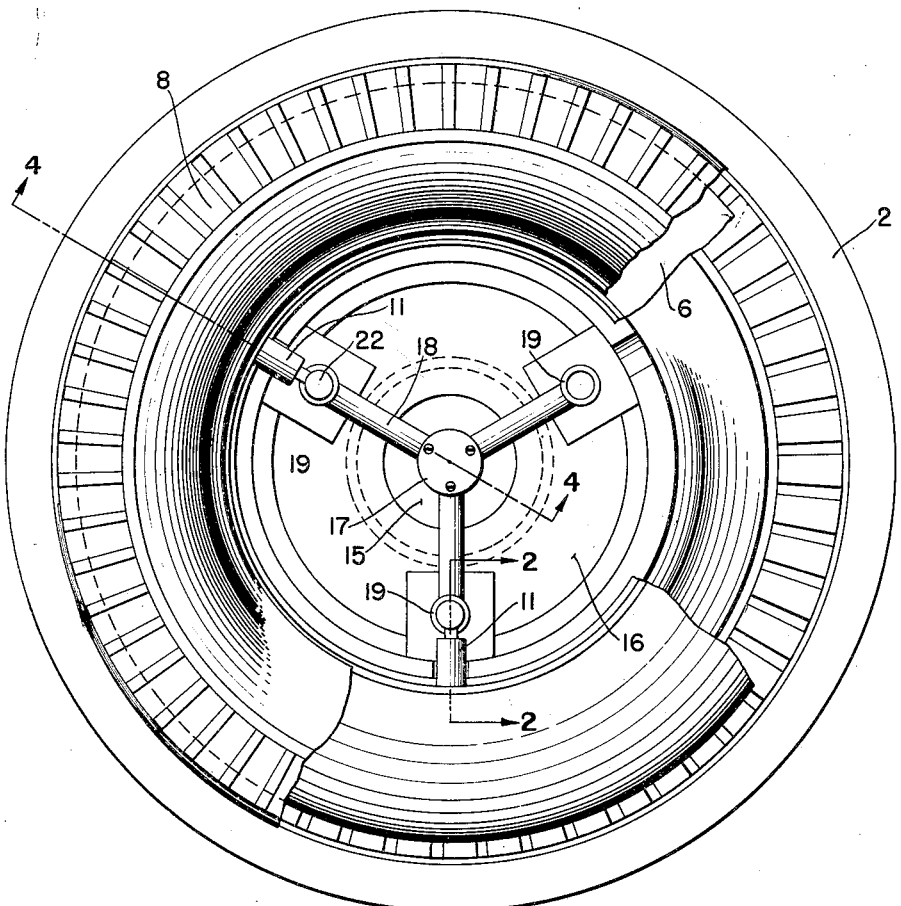
Fig. 1 is a plan view of a lower mold half having a tire carcass and air bag positioned in the mold, and showing portions of the fluid pressure and radio frequency current supply means incorporated in the apparatus.
Figure 3:
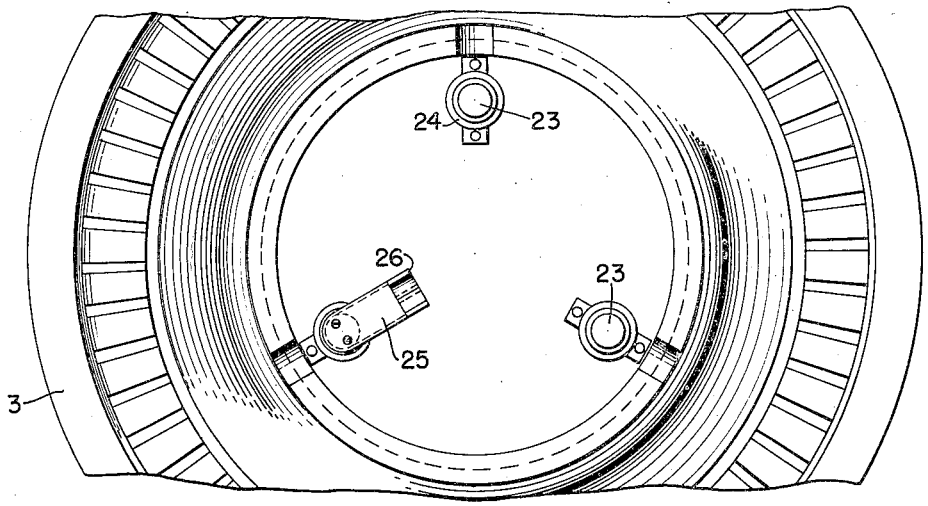
Fig. 3 is a bottom plan view of the upper mold half of the apparatus.

The invention preferably employs a plurality of valve stems 9 on the air bag, for example, three positioned at uniformly spaced points around the air bag in the manner best seen in Figs. 1 and 3.

Conduit means are provided for applying fluid under pressure to the interior of the air bag 6, and for simultaneously applying radio frequency current to the electrode 7 of the air bag. Such means take the form of a hollow metal post or tube 14 positioned substantially centrally of the lower mold 2 and platen 5, the tube 14 being carried on a round disc 15 of insulating material mounted at its periphery upon a flange or bracket 16 secured to the lower platen 5. A cap 17 secured to the top of the tube 14 receives a plurality of metal arms 18 at least two of which are tubular. The arms extend towards the respective valve stems 9, and are uniformly spaced circumferentially.

The arms 18 terminate in upwardly directed cups 19 each of which carries a compression spring 20 which is positioned between the bottom of the cup and a gasket 21 slidably positioned in the cup. A metal L conduit 22 is secured in fluid tight relation in each valve stem 9, and has a downwardly extending portion which is movable into the cup 19 during the closing of the mold and against the sealing gasket 21, the gasket yielding under the action of the compression spring 20.

Associated with the upper mold 3 or platen 4 is a pressure block 23, formed of ceramic or other insulating material, the block being held in a cup 24. The purpose of the block 23 is to positively engage with the upper end of the L 22 when the mold is closed to hold it in tight sealing relation in the cup 19 against the gasket 21. A metal spring clip conductor 25 having a downwardly extending portion 26 clipping in electrical contact relation around the arm 18 is provided, this clip also having a flat horizontally extending portion which is held by the pressure block 23 against the upper end of the L 22 to insure good electrical contact between the arm and the metal valve stem 9.

Figure 2:
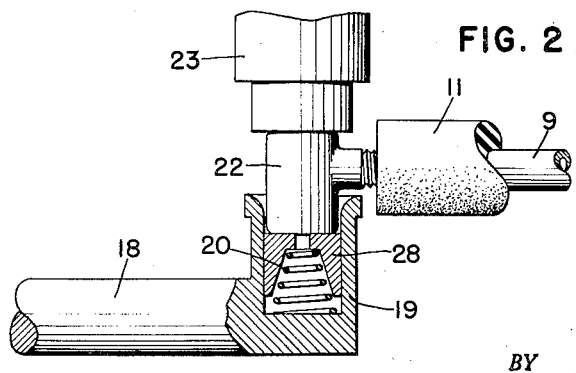
Fig. 2 is an enlarged, fragmentary view taken substantially on line II—II of Fig. 1 and illustrating the details of the automatic connection between the air bag and the current and fluid supply means of Fig. 1.

Fluid under pressure is applied by way of a conduit 27 to one of the tubular arms 18 to supply fluid under pressure to the interior of the air bag 6, and, if desired, the fluid under pressure in the interior of the air bag may flow out through one of the other valve stems in the bag back through the second of the tubular arms 18 and back out between the tube 14 and the conduit 27 to exhaust. Generally at least one of the arms 18, as seen in Fig. 2, is formed solid inasmuch as no additional fluid pressure return is necessary, and in this case, the rubber gasket 21 is replaced with a brass contact 28 which engages with the bottom end of the L 22. In this structure, it is unnecessary to use the spring contact clip 25 associated with the tubular arms 18.

Radio frequency current is supplied to the tube 14 by a connector ring 29 from a radio frequency generator so that radio frequency current will flow through the tube 14, cap 17, and arms 18, to the L's 22 by way of the brass contact 28 or the spring clips 25. Thus, radio frequency current is supplied to the valve stems 9 and the electrode 7 of the air bag 6, the radio frequency current being fed to the electrode in this manner at several simultaneous points spaced uniformly around the circumference of the bag. The other side of the radio frequency generator is connected to the mold 1, this usually being the ground side, to complete the flow of electric radio frequency current to the tire carcass 8 to effect the vulcanization thereof.

Upon the completion of the vulcanizing operation, the upper platen 4 and the upper mold half 3 are raised to open up the mold and to simultaneously move the pressure blocks 23 away from the L's 22. The pneumatic tire and the air bag therein can now be lifted from the lower mold half 2 after the spring clips 25 are lifted out of the way. The air bag and its associated valve stems and L's is removed from the vulcanized tire carcass and is ready for insertion in another unvulcanized tire carcass by means of the usual bagging and tire shaping apparatus.

In the actual vulcanization of the pneumatic tire, air, steam, $CO_2$, hot or cold water, or other fluid can be positioned inside of the air bag or circulated through the air bag under any desired pressure, in accord with known practices.

From the foregoing, it will be recognized that the various objects of the invention have been achieved by the provision of a relatively inexpensive, simple, readily constructed and operated apparatus for utilizing radio frequency current for the vulcanization of pneumatic tires. The conduit means utilized to supply fluid under pressure to the interior of the air bag during the vulcanizing operation are also utilized to supply radio frequency current to an electrode associated with the air bag. Means positioned in the conduit means functions to automatically connect the conduit means to the air bag valve stems during the vulcanizing operation, and functions automatically to disconnect the conduit means from the valve stems upon the completion of the vulcanizing operation.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for vulcanizing pneumatic tires including upper and lower platens, cooperating tire mold parts carried by the platens, a rubber air bag having a high frequency electrode associated therewith and adapted to be received in a tire carcass adapted to be positioned in the mold, a tubular post extending centrally through one of the platens, hollow arms at spaced intervals extending from the post towards the air bag and terminating in upwardly-directed cups, a valve stem associated with the air bag in alignment with each arm, each valve stem being connected to hte electrode, a hollow L secured to each valve stem and adapted to fit in sealing relation into a cup when the mold parts are closed, means for supplying fluid into one arm for passage to the interior of the air bag, means for supplying radio frequency current to the post for flow to the air bag electrode, and means electrically insulating the current flow circuit from the mold and platens.

2. Apparatus for vulcanizing pneumatic tires including cooperating tire mold parts, a rubber air bag having a high frequency electrode associated therewith and adapted to be received in a tire carcass adapted to be positioned in the mold, a tubular post extending centrally through one of the mold parts, hollow arms at spaced intervals extending from the post towards the air bag and terminating in upwardly-directed cups, a valve stem associated with the air bag in alignment with each arm, each valve stem being connected to the electrode, a hollow L secured to each valve stem and adapted to fit in sealing relation into a cup when the mold parts are closed, means for supplying fluid into one arm for passage to the interior of the air bag, means for supplying radio frequency current to the post for flow to the air bag electrode and means electrically insulating the current flow circuit from the mold.

3. Apparatus for vulcanizing pneumatic tires including cooperating tire mold parts, a rubber air bag having a high frequency electrode associated therewith and adapted to be received in a tire carcass adapted to be positioned in the mold, a tubular post extending centrally through one of the mold parts, hollow arms at spaced intervals extending from the post towards the air bag, a valve stem associated with the air bag in alignment with each arm, each valve stem being connected to the electrode, means secured to each valve stem and adapted to engage in sealing relation with an arm when the mold parts are closed, means for supplying fluid into one arm for passage to the interior of the air bag, means for supplying radio frequency current to the post for flow to the air bag electrode, and means electrically insulating the current flow circuit from the mold.

4. Pneumatic tire vulcanizing apparatus including a two part mold, a rubber air bag adapted to be positioned internally of the mold when it is closed, a high frequency electrode associated with the air bag, a plurality of valve stems on the air bag and electrically connected to the electrode, means electrically insulating the electrode and valve stems from the mold, metallic conduit means adapted to be connected to the valve stems, means supplying fluid to the interior of the air bag through the inside of the conduit means, means supplying radio frequency current to the electrode by way of the metallic portion of the conduit means, and means for automatically connecting the conduit means and the valve stems when the mold is closed and automatically disconnecting the conduit means and the valve stems when the mold is open.

5. Pneumatic tire vulcanizing apparatus including a two part mold, a rubber air bag adapted to be positioned internally of the mold when it is closed, a high frequency electrode associated with the air bag, a plurality of valve stems on the air bag and electrically connected to the electrode, means electrically insulating the electrode and valve stems from the mold, metallic conduit means adapted to be connected to the valve stems, means supplying fluid to the interior of the air bag through the inside of the conduit means, and means supplying radio frequency current to the electrode by way of the metallic portion of the conduit means.

6. Pneumatic tire vulcanizing apparatus including a two part mold, a rubber air bag adapted to be positioned internally of the mold when it is closed, a high frequency electrode associated with the air bag, a valve stem on the air bag and electrically connected to the electrode, means electrically insulating the electrode and valve stem from the mold, metallic conduit means adapted to be connected to the valve stem, means supplying fluid to the interior of the air bag through the inside of the conduit means, and means supplying radio frequency current to the electrode by way of the metallic portion of the conduit means.

7. Pneumatic tire vulcanizing apparatus including a two part mold, a rubber air bag adapted to be positioned internally of the mold when it is closed, a high frequency electrode associated with the air bag, a valve stem on the air bag and electrically connected to the electrode, means electrically insulating the electrode and valve stem from the mold, metallic conduit means adapted to be connected to the valve stem, means supplying fluid to the interior of the air bag through the inside of the conduit means, means supplying radio frequency current to the electrode by way of the metallic portion of the conduit means, and means for automatically connecting the conduit means and the valve stem when the mold is closed and automatically disconnecting the conduit means and the valve stem when the mold is open.

8. A quick release connection for use with a high frequency electrode type airbag and molds for vulcanizing a pneumatic tire, and comprising a tubular post, hollow arms at spaced intervals extending from the post and terminating in upwardly directed cups, a rubber sealing gasket in each cup, a hollow L for each cup and adapted to be secured to a separate valve stem on the airbag and fitting into a cup in sealing relation with the gasket, means engaging with each L and adapted to be operated by the closing of the mold to move the L into the cup, means for supplying fluid to the post for passage through at least one arm, means for supplying radio frequency current to the post for passage to the arms, and flexible metal clip means bridging the cup and L and completing the electric circuit therethrough.

9. A quick release connection for use with a high frequency electrode type airbag and molds for vulcanizing a pneumatic tire, and comprising a tubular post, hollow arms at spaced intervals extending from the post and terminating in upwardly directed cups, a rubber sealing gasket in each cup, a hollow L for each cup and adapted to be secured to a separate valve stem on the airbag and fitting into a cup in sealing relation with the gasket, means engaging with each L and adapted to be operated by the closing of the mold to move the L into the cup, means for supplying fluid to the post for passage through at least one arm, and means for supplying radio frequency current to the post for passage to the arms.

ROBERT S. ENABNIT.

REFERENCES CITED

The following references are of record in the file of this patent:

UNITED STATES PATENTS

| Number | Name | Date |
|---|---|---|
| 1,663,979 | Gammeter | Mar. 27, 1928 |
| 2,094,347 | Cady | Sept. 28, 1937 |
| 2,100,627 | Bucy et al. | Nov. 30, 1937 |
| 2,438,952 | Te Grotenhuis | Apr. 6, 1948 |